June 7, 1927.

W. L. D'OLIER ET AL 1,631,585

SCREEN PLATE

Filed Nov. 1, 1921

INVENTORS
William L. D'Olier
Theodore Pohlin
BY
Gifford & Bull
ATTORNEYS

Patented June 7, 1927.

1,631,585

UNITED STATES PATENT OFFICE.

WILLIAM L. D'OLIER AND THEODORE TOHLIN, OF PHILADELPHIA, PENNSYLVANIA; SAID TOHLIN ASSIGNOR TO SAID D'OLIER.

SCREEN PLATE.

Application filed November 1, 1921. Serial No. 512,046.

Our present invention relates to screen plates such as used in screening solids from fluids containing the same, and particularly to screen plates adapted to be formed into large screens for use where large quantities of fluids pass through the screens and in which the screens are subjected to considerable pressure.

Such plates must be relatively thick to give the necessary strength to prevent the collapse of the plates under the pressure to which they are subjected. Preferably, the openings through which the fluid passes are made in the form of long but very narrow slits. If such slits were of the same depth as the thickness of the plates, they would be readily clogged by the fine particles which pass through with the fluid and moreover, the screen would be cleaned with difficulty by brushes or the like, such as are used in cleaning such screens when the screens are a part of a rotary device, or the like, in which each part of the screen is regularly inserted in the liquid and then withdrawn to be cleaned before again entering the liquid.

Heretofore, such screen plates have been formed with clearance slots in the back thereof, whereby ribs are left between the slots to give the necessary strength to the plates, and a single screening slit above each slot and communicating with it. In this way, the depth of the slits may be very small but the number of slits in a given area of plate is limited to the number of clearance spaces. The number of clearance spaces is necessarily limited by the number and thickness of the ribs necessary to give the required strength to the plate. Because of the clearance spaces, the depth of the slits is reduced but, because of the relatively few slits which can be provided in a given area of plate by this arrangement, the rate of flow of fluid through such area is relatively small.

By our invention, we greatly increase the number of slits in a given area while retaining substantially the same strength of plate. This increase in area may be theoretically as much as 80 per cent, but in practice it will be less.

Figure 2:
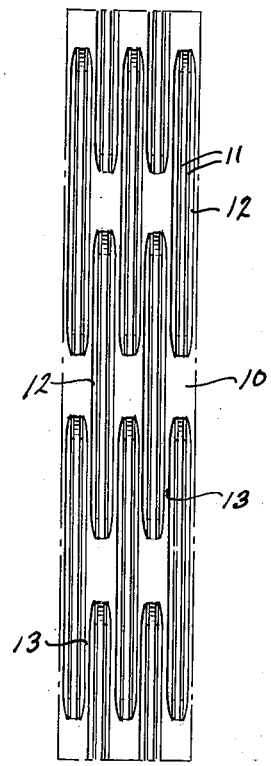
Figure 3:
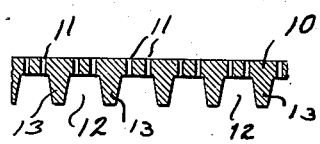
Figure 1:
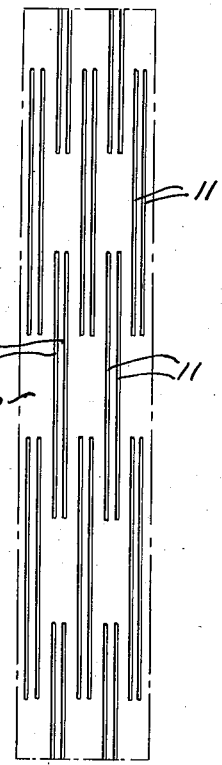

In the drawing, which shows an illustrative form of our invention, Figure 1 is a view of the front of a part of a screen plate embodying our invention; Fig. 2 is a view of the back of Fig. 1, and Fig. 3 is a cross section of Fig. 1.

The same reference characters refer to the same parts in the several views.

We have illustrated in the drawing, a portion only of a screen plate 10 on an enlarged scale. It will be understood that the plate may be made as large as desired and that the complete screen will preferably consist of a plurality of such plates supported in a frame, the arrangement of screening slits and clearance slots shown being repeated over each plate. If desired, each plate may be provided with an imperforate margin by which the plate is held.

The screening slits 11 in the front of the plate, are each long and narrow and of a width adapted to the particular work for which the screen is to be used. Preferably, the slits, as shown, are arranged in rows extending across the plate, with a solid part of the plate between the ends of the slits in each group and with the groups in adjacent rows staggered.

Preferably, the slits 11 are arranged in groups, each comprising a plurality of slits (in the form shown, two in number) arranged relatively close together and the space between the adjacent groups greater than the distance between the slits in each group.

At the back of the plate are uniformly spaced clearance slots 12. Ribs 13 separate the clearance slots 12. The shape and depth of these slots in cross section may be widely varied but, as shown, they are formed with diverging walls. Each clearance space is located beneath a group of the slits 11, with the closely spaced slits in each group communicating with a single clearance space.

If desired, more than two slits may form a group which communicates with each slot, but such an arrangement would involve a correspondingly wider clearance space and a corresponding decrease in the strength of the plate, because of the wider spacing of the ribs 13. Such wider spacing and decrease in strength, however, would not be in the ratio of the gain in total area of the slits, since, if four slits, for instance, were provided for each slot, instead of the two shown, the area of the slits through which fluid may pass would be doubled, whereas the width of the clearance space would not be doubled but would be increased only the amount equal to twice the width of the slits plus twice the distance between the closely spaced slits communicating with a single clearance slot.

The advantages of our illustrative form over the arrangement having a single slit for each clearance space will be evident. Without reducing the width of the clearance slots or the width, and therefore the strength, of the ribs between them, we can substantially double the total number of slots in a given area over the number heretofore possible, with a corresponding increase in the flow area of the screen and of the quantity of fluid which can pass therethrough in a given time, and, at the same time, the strength of the plate is substantially the same, since the clearance space need be widened and the distance between the ribs correspondingly increased only by the width of the additional slits provided for each clearance space plus the small distance between such additional slits.

In the form illustrated, where two slits communicate with each slot, this increased distance will be only the width of the slit plus the small distance at which the slits need be spaced. If desired, the plates may be made of exactly the same strength as that of a plate with a single slit for each slot, by arranging the slits so that a greater distance than illustrated may be provided between each group, thereby increasing the width of each rib to provide sufficient additional strength to compensate for the wider spacing of the ribs. In such an arrangement, however, the increase in flow area will not be so great as in the arrangement first described.

In other words, by our arrangement of slits, where, for instance, two slits communicate with each slot, we may either substantially double the flow area of the former arrangement where a single slit communicated with each slot, and, at the same time, reduce the strength of the plate slightly, or we may retain the former strength of the plate and increase the flow area something less than double. The latter is our preferred arrangement.

Preferably, we arrange the slits in rows extending across the plate with a solid part of the plate between the ends of the slits in each row, and stagger the groups in adjacent rows, in the manner illustrated. This arrangement adds materially to the total strength of the plate.

It will be also understood that the plates may be made of a metal adapted to resist the corrosive effect of the liquid being screened.

It will also be understood that the form of plate shown is only illustrative and that the embodiment of our invention may be widely varied.

We claim:—

A screen plate having a plurality of uniformly spaced parallel clearance spaces in the back thereof, said spaces being relatively long and narrow, and relatively long and narrow screening slits in the front of the plate and parallel to said spaces and arranged in groups, each group comprising a plurality of said slits side by side with the slits in each group communicating with one of said clearance spaces, the distance between the slits comprising each group being less than the distance between the groups.

WILLIAM L. D'OLIER.
THEODORE TOHLIN.